United States Patent Office

3,411,916
Patented Nov. 19, 1968

3,411,916
SOLUBILIZED SENSITIZING DYES
Leslie G. S. Brooker and Grafton H. Keyes, Rochester, N.Y., assignors to Eastman Kodak Company, Rochester, N.Y., a corporation of New Jersey
No Drawing. Original application Mar. 19, 1962, Ser. No. 180,854, now Patent No. 3,352,857, dated Nov. 14, 1967. Divided and this application Apr. 3, 1967, Ser. No. 643,765
7 Claims. (Cl. 96—106)

This application is a divisional of copending U.S. patent application Ser. No. 180,854 filed Mar. 19, 1962.

This invention is related to solubilized sensitizing dyes and particularly to cyanine and related dyes which are substituted with sulfoalkoxyalkyl groups and to the process for making these dyes.

Certain dyes of the cyanine, carbocyanine and merocyanine dye series are known to extend the sensitivity of photographic silver halide emulsion layers. Sensitizing dyes are usually added as a solution to the photographic silver halide emulsion during its manufacture.

Because many of the prior art sensitizing dyes have limited water solubility, it is often necessary to use organic solvents such as the lower alcohols, e.g., methyl, ethyl, propyl, etc., acetone, pyridine, etc., in order to dissolve the dyes in a solution that can be added to the silver halide emulsion. The use of organic solvents in this manufacturing operation is undesirable for various reasons such as cost, hazards, etc. Dyes having such limited solubility are likely to be incompletely removed from the emulsion layer during the photographic processing operation and thus be the source of undesirable stain in the developed photographic element.

In order to overcome these difficulties, dyes are desired which have a higher degree of solubility in solvents such as water or in lower alcohols than some of the available dyes. Methods for solubilizing conventional dyes are desired.

It is, therefore, an object of our invention to provide a new class of solubilized cyanine and related dyes which are valuable for sensitizing photographic silver halide emulsions.

Another object is to provide cyanine and related types of sensitizing dyes which have an N-sulfoalkoxyalkyl substituent on the heterocyclic nucleus that confers high solubility in solvents such as water and the lower alcohols.

Another object is to provide a process for solubilizing conventional cyanine and merocyanine type dyes by reacting a quaternized N-hydroxyalkyl substituted cyanine or merocyanine dye with an alkane sulfone.

Still other objects will become evident from the following specification and claims.

These and other objects are accomplished according to our invention by the preparation of solubilized cyanine and merocyanine dyes which have the nitrogen atom of at least one nitrogen containing heterocyclic nucleus substituted with a sulfoalkoxyalkyl group.

Our solubilized cyanine types of sensitizing dyes including those represented by the formula:

I 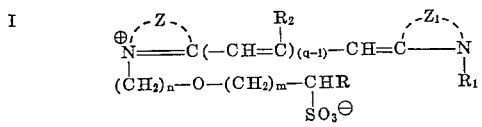

and include the merocyanine dyes represented by the formula:

II 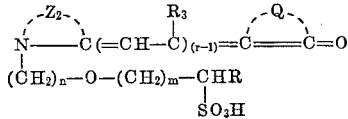

wherein Z, $Z_1$ and $Z_2$ each represents the nonmetallic atoms necessary to complete a heterocyclic nucleus including a heterocyclic nucleus of the thiazole series (e.g., thiazole, 4-methylthiazole, 4-phenylthiazole, 4,5-diphenylthiazole; etc.), a heterocyclic nucleus of the benzothiazole series (e.g., benzothiazole, 5-chlorobenzothiazole, 6-chlorobenzothiazole, 6-methoxybenzothiazole, 6-methylbenzothiazole, 5-methylbenzothiazole, 4-methylbenzothiazole, 4-methoxybenzothiazole, etc.), a heterocyclic nucleus of the naphthothiazole series (e.g., α-naphthothiazole, β-naphthothiazole, etc.), a heterocyclic nucleus of the selenazole series (e.g., selenazole, 4-methylselenazole, 4-phenylselenazole, etc.), a heterocyclic nucleus of the benzoselenazole series (e.g., benzoselenazole, 5-chlorobenzoselenazole, etc.), a heterocyclic nucleus of the naphthoselenazole series( e.g., α-naphthoselenazole, β-naphthoselenazole, etc.), a heterocyclic nucleus of the oxazole series (e.g., oxazole, 4-methyloxazole, 4-phenyloxazole, 4,5-diphenyloxazole, etc.), a heterocyclic nucleus of the benzoxazole series (e.g., benzoxazole, 5-phenylbenzoxazole, 5-chlorobenzoxazole, 5-methylbenzoxazole, 5-methoxybenzoxazole, 6-methylbenzoxazole, 4-methoxybenzoxazole, 4-chlorobenzoxazole, etc.), those of the naphthoxazole series (e.g., α-naphthoxazole, β-naphthoxazole, etc.), a heterocyclic nucleus of the pyridine series (e.g., pyridine, 2-methylpyridine, 3-methylpyridine, 5-methylpyridine, 2-chloropyridine, 3-chloropyridine, 2-methoxypyridine, 3-ethoxypyridine, etc.), a heterocyclic nucleus of the quinoline series including the 2-quinolines (e.g., quinoline, 3-methylquinoline, 5-methylquinoline, 7 - methylquinoline, β - methylquinoline, 6-chloroquinoline, β-chloroquinoline, 6-methoxyquinoline, etc.), those of the isoquinoline series (e.g., the 1-isoquinolines, the 3-isoquinolines, etc.), a heterocyclic nucleus of the imidazole series (e.g., imidazole, 4-methylimidazole, 5-ethylimidazole, 4-chloroimidazole, 4,5-dichloroimidazole, 4 - methoxyimidazole, 5-phenylimidazole, etc.), a heterocyclic nucleus of the benzimidazole series (e.g., benzimidazole, 4-methylbenzoimidazole, 5-methylbenzimidazole, 6 - methylbenzimidazole, 5,6 - dichlorobenzimidazole, 5 - chlorobenzimidazole, 5-phenylbenzoimidazole, 6-phenylbenzimidazole, etc.), a heterocyclic nucleus of the naphthimidazole series (e.g., α-naphthimidazole, β - naphthimidazole, etc.), a heterocyclic nucleus of the 3,3-dialkylindolenine series (e.g., 3,3 - dimethylindolenine, 3,3 - diethylindolenine, etc.), a heterocyclic nucleus of the lepidine series (e.g., lepidine, 7-chlorolepidine, 7-methyllepidine, etc.); q represents an integer of 1, 2 or 3; m and n each represents an integer 2, 3 or 4; R represents a hydrogen atom or a lower alkyl group such as methyl, ethyl, propyl, isopropyl, butyl, secondary butyl, tertiary butyl, etc.; $R_1$ represents a lower alkyl group, such as methyl, ethyl, propyl, butyl, etc., a carboxyalkyl group, such as carboxymethyl, carboxyethyl, carboxypropyl, carboxybutyl, etc., a carbalkoxyalkyl group, such as carbomethoxymethyl, carbethoxyethyl, carbopropoxyethyl, carbopropoxybutyl, etc., a sulfoalkyl group, such as sulfomethyl, sulfoethyl, sulfopropyl, sulfobutyl, etc., a hydroxyalkyl group, such as hydroxymethyl, hydroxyethyl, hydroxypropyl, hydroxybutyl, etc., an alkoxyalkyl group, such as methoxyethyl, methoxypropyl, methoxybutyl, ethoxyethyl, ethoxypropyl, etc., a sulfoalkoxyalkyl group having the formula $$-(CH_2)_n-O-(CH_2)_m-\underset{\underset{SO_3H}{|}}{CHR}$$

in which $n$, $m$ and R are as defined, an aryl group, such as phenyl, 4-methylphenyl, 4-chlorophenyl, etc.; $R_2$ represents a hydrogen atom, a lower alkyl group such as methyl, ethyl, propyl, butyl (etc., an alkoxy group, such as methoxy, ethoxy, propoxy, butoxy, etc., an aryl group, such as phenyl, 4-hydroxyphenyl, 4-chlorophenyl, 2,4,6-trichlorophenyl, 5-bromophenyl, 2-iodophenyl, 4-methylphenyl, 4-ethylphenyl, 4-methoxyphenyl, 3-methoxyphenyl, 4-ethoxyphenyl, etc., a substituted mercapto group, such as methylmercapto, ethylmercapto, propylmercapto, butylmercapto, phenylmercapto, 4-methylphenylmercapto, etc., a thienyl group, an indolyl group, a furyl group, a pyrryl group, a pyrrocolyl group, etc., such that when $q$ is the integer 3, $R_2$ is a hydrogen atom; $r$ is the integer 2 or 3; $R_3$ represents a hydrogen atom, an alkyl group, such as methyl, ethyl, propyl, butyl, etc., an aryl group, such as phenyl, 4-methylphenyl, 2-methylphenyl, 3 - ethylphenyl, 4 - methoxyphenyl, 3-methoxyphenyl, 4-chlorophenyl, 2,4,6-trichlorophenyl, 4-bromophenyl, 4-iodophenyl, etc., a heterocyclic group, such as a thienyl group, an indolyl group, a furyl group, a pyrryl group, a pyrrocolyl group, etc., such that when $r$ is 3, $R_3$ is a hydrogen atom; Q represents the nonmetallic atoms necessary to complete a heterocyclic nucleus of the 2-pyrazolin-5-one series (e.g., 3-methyl-1-phenyl-2-pyrazolin-5-one, 3-ethyl-1-phenyl-2-pyrazolin-5-one, 3-phenyl-1-methyl-2-pyrazolin-5-one, etc.), a heterocyclic nucleus of the indandione series (e.g., 1,3 - diketohydrindene, etc.), those of the 2,4,6-trietohexahydropyrimidine cr 2,4,6-triketo-2-thiohexahydropyrimidine series (e.g., barbituric acid or 2-thiobarbituric acid as well as their 1-alkyl (e.g., 1 - methyl, 1 - ethyl, 1 - n-propyl, 1-n-heptyl, etc.) or 1,3-dialkyl (e.g., 1,3-dimethyl, 1,3-diethyl, 1,3-di-n-propyl, 1,3-dicyclohexyl, etc.) or 1,3-diaryl (e.g., 1,3-diphenyl, 1,3 - di(p - chlorophenyl), etc.), or 1-aryl (e.g., 1-phenyl, 1 - p - chlorophenyl, 1-p-ethoxycarbonylphenyl), etc., or 1-alkyl-3-aryl (e.g., 1-ethyl-3-phenyl, 1-n-heptyl-3-phenyl, etc.) derivatives, etc.; a heterocyclic nucleus of the rhodanine series (e.g., rhodanine, 3-ethylrhodanine, 3-propylrhodanine, 3-butylrhodanine, 3-(p-carboxyphenyl)rhodanine, 3 - (p-sulfophenyl)rhodanine, etc.), a heterocyclic nucleus of the hydantoin series (e.g., hydantoin, 1 - (p-carboxyphenyl)-3-phenylhydantoin, 1-ethyl-3-phenylhydantoin, etc.), a heterocyclic nucleus of the thiohydantoin series (e.g., 2-thiohydantoin, 1-p-carboxyphenyl-3-phenyl-2-thiohydantoin, 1-p-sulfophenyl-3-phenyl-2-thiohydantoin, 1 - ethyl - 3 - phenyl - 2-thiohydantoin, etc.), a heterocyclic nucleus of the 2-thio-2,4-oxazolidinedione series (e.g., 2-thio-2,4-oxazolidinedione, 3-(p-sulfophenyl)-2-thio-2,4-oxazolidinedione, 3-ethyl-2-thio-2,4-oxazolidinedione, etc.), etc.

In addition to the solubilized cyanine dyes of Formula I we have found that it is advantageous to solubilize the holopolar dyes corresponding to the carbocyanines of Formula I, including those described by Brooker and White U.S. Patent 2,739,964, reissued as Reissue 24,292, Mar. 19, 1957; and others by the substitution of our sulfoalkoxyalkyl groups on the nitrogen atom of at least one of the heterocyclic nuclei of the molecule. Examples to illustrate these dyes include dyes such as 4-{[5-chloro-3-ethyl-2(3H)-benzothiazolylidene] [3 - β - (3-sulfobutoxy)ethyl-2(3H) - benzothiazolylidene]isopropylidene}-3-phenyl-5(4H)isoxazolone, 1,3 - diethyl-4-{[1 - ethyl-2 (1H)-naphtho[1,2 - d]thiazolylidene] [1 - β - (4 - sulfobutoxy)ethyl-2(1H)-naphtho[1,2 - d]thiazolylidene]isopropylidene}barbituric acid, 1,3 - diethyl - 5 - {[3-ethyl-2 (3H)-benzothiazolylidene] [1 - β(4-sulfobutoxy)ethyl-2 (1H)quinolylidene]isopropylidene}-2-thiobarbituric acid, etc.

In addition to the solubilized merocyanine dyes of Formula II, we have found that it is advantageous to solubilize complex merocyanines including those described by Sprague U.S. Patent 2,519,001, issued Aug. 15, 1950, Brooker and White U.S. Patent 2,526,632, issued Oct. 24, 1950; Knott U.S. Patent 2,739,965, issued Mar. 27, 1956; Knott U.S. Patent 2,729,766, issued Dec. 27, 1955; Knott U.S. Patent 2,743,272, issued Apr. 24, 1956; and others by the substitution of our sulfoalkoxyalkyl groups on the nitrogen atom of at least one heterocyclic nucleus of the molecule. Examples to illustrate these dyes include 5-[(3-ethyl-2(3H)-benzoxazolylidene)ethylidene]-2-[(3-methyl-5-oxo-1-(p-sulfophenyl)-4 - (2-pyrazolinylidene)]-3-β-(4-sulfobutoxy)ethyl-4-thiazolidene, 2-[2-ethoxy - 2-(2-ethylthio-5-oxo-4-thiazolinylidene) ethylidene]-3-methyl-4-{[3-β-(4 - sulfobutoxyethyl)-2-(3H)-benzothiazolylidene]ethylidene}-5-thiazolidone, 3-carbethoxymethyl-2-[2 - (3-carbethoxymethyl-4-oxo-2 - thiono-5-thiazolidylidene)-2-ethoxyethylidene]-5-{[1-β-(4-sulfobutoxy)ethyl - 2 - (1H) - naphtho[1,2 - d]thiazolylidene]ethylidene}-4-thiazolidone, etc.

Our sulfoalkoxyalkyl solubilized dyes are prepared by forming the appropriate hydroxyalkyl substituted quaternary salt of the appropriate heterocyclic bases then either:

(A) (1) condensing by conventional means the hydroxyalkyl substituted quaternary salt of the heterocyclic base with the appropriate intermediate to form a symmetrical or unsymmetrical dihydroxyalkyl substituted or a monohydroxyalkyl substituted dye, and (2) reacting this dye with the appropriate alkane sulfone; or (B) (1) reacting the hydroxyalkyl substituted quaternary salt of the appropriate heterocyclic base with the appropriate alkane sulfone, and then (2) condensing by conventional means the sulfoalkoxyalkyl substituted quaternary salt of the heterocyclic base with the appropriate intermediate to form either the symmetrical or unsymmetrical cyanine dye, or the merocyanine dye.

Method A for preparing our dyes is illustrated by the following two paragraphs.

The solubilized dyes of Formula I in which $R_1$ is an alkyl group or an aryl group and $R_2$ is a hydrogen atom, an alkyl, an alkoxy or an aryl group are prepared advantageously by reacting a hydroxyalkyl substituted dye having the formula:

III
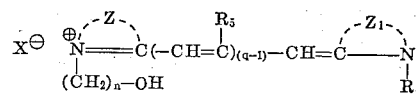

in which Z, $Z_1$, $n$ and $q$ are as defined previously, $X^\ominus$ represents any convenient anionic group, such as chloride, bromide, iodide, p-toluenesulfonate, thiocyanate, perchlorate, acetate, methylsulfate, ethylsulfate, etc.; and $R_4$ represents a lower alkyl group, such as methyl, ethyl, propyl, butyl, etc., and an aryl group, such as phenyl, 4-methoxyphenyl, 4-chlorophenyl, etc., with an alkane sulfone having the formula:

IV

in which $m$ and R are as defined previously.

Our sulfoalkoxyalkyl solubilized dyes of Formula II in which Q represents the nonmetallic atoms necessary to complete a heterocyclic nucleus of the 2-pyrazolin-5-one series, the indandions series, the 2,4,6-triketohexahydropyrimidine, and the 2,4,6-triketo-2-thiohexahydropyrimidine series are prepared advantageously by heating a mixture of (1) a N-hydroxyalkyl substituted merocyanine type dye represented by the formula:

V
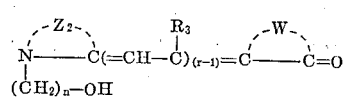

in which $Z_2$, $n$ and $r$ are as defined previously, and W represents the nonmetallic atoms necessary to complete a heterocyclic nucleus of the 2-pyrazolin-5-one series (e.g., 3-methyl-1 - phenyl-2-pyrazolin-5-one, 3-ethyl-1-phenyl-2-pyrazolin-5-one, 3-phenyl-1-methyl - 2 - pyrazolin-5-one, etc.), a heterocyclic nucleus of the indandione series (e.g., 1,3-diketohydrindene, etc.), those of the 2,4,6-triketohexahydropyrimidine or 2,4,6-triketo-2-thiohexahydropyrimidine series (e.g., barbituric acid or 2-thiobarbituric acid as well as their 1-alkyl (e.g., 1-methyl, 1-ethyl, 1-n-propyl, 1-n-heptyl, etc.) or 1,3-dialkyl (e.g., 1,3-dimethyl, 1,3-diethyl, 1,3-di-n-propyl, 1,3-dicyclohexyl, etc.) or 1,3-diaryl (e.g., 1,3-diphenyl, 1,3-di-(p-chlorophenyl), etc.), or 1-aryl (e.g., 1-phenyl, 1-p-chlorophenyl, 1-p-ethoxycarbonylphenyl), etc., or 1-alkyl-3-aryl (e.g., 1-ethyl-3-phenyl, 1-n-heptyl-3-phenyl, etc.) derivatives, etc.; and (2) an alkane sulfone of Formula IV.

All of the dyes of Formulas I and II and the holopolar and complex merocyanines are prepared advantageously by Method B described previously. In this synthesis the hydroxyalkyl substituted quaternary salt of the heterocyclic base is reacted with an alkane sulfone and the resulting sulfoalkoxyalkyl substituted quaternary salt of the heterocyclic base is then condensed by well-known conventional reactions with the appropriate intermediate to produce the solubilized dye of Formula I, Formula II, the holopolar dye or the complex merocyanine.

For example, symmetrical dyes of Formula I are prepared by reacting the appropriate sulfoalkoxyalkyl substituted quaternary salt with an appropriate ortho ester in pyridine. Unsymmetrical dyes of Formula I are prepared by condensing the appropriate sulfoalkoxyalkyl substituted quarternary salt with the appropriate intermediate, for example, a 2-acetanilidovinyl derivative of a quaternary salt of the heterocyclic base such as 2-acetanilidovinyl-3-ethylbenzothiazolium iodide or the corresponding derivatives of some other heterocyclic nucleus, to prepare the dye in which $R_2$ is hydrogen, or a 2-($\beta$-methylmercapto)propenyl derivative of the appropriate quaternary salt of the heterocyclic base, such as 3-ethyl-2-($\beta$-methylmercapto)propenylbenzothiazolium p-toluene sulfonate or the corresponding derivative of some other heterocyclic nucleus, to prepare the dye in which $R_2$ is a methyl group. These condensations are effected in the presence of a lower alcohol and triethylamine, pyridine or other condensing agent.

Dyes of Formula II are prepared by condensing the appropriate sulfoalkoxyalkyl substituted quaternary salt of the heterocyclic base with any of the appropriate intermediates such as, for example, 5-acetanilidomethylene-3 - ethylrhodanine, 5 - acetanilidoallylidene-1,3-diethyl barbituric acid, 5-(5-acetanilido-2,4-pentadienylidene-1,3-diethyl)barbituric acid, etc. Similarly, corresponding intermediates having other heterocyclic nuclei are used to make other dyes of this type. Condensing agents used to advantage are pyridine, mixtures of lower alcohols and triethylamine, etc.

The intermediates used in these syntheses are well known in the art having been described in many patents.

The synthesis of the holopolar dyes is analogous to the synthesis described in U.S. patents such as U.S. 2,-739,964, reissued as Reissue 24,292; etc., and the synthesis of the complex merocyanine dyes is analogous to the syntheses described in U.S. patents such as U.S. 2,-519,001; U.S. 2,526,632; U.S. 2,728,766; U.S. 2,739,965; U.S. 2,743,272; etc., previously listed. In each instance the appropriate sulfoalkoxyalkyl substituted quaternary salt of a heterocyclic base is used in place of the quaternary salt used in these references.

Some of the holopolar dyes and some of the complex merocyanines are also advantageously prepared by Method A.

The quaternary salts of the heterocyclic bases used to make our dyes are all well known in the art and are described in many patents. Many of the N-hydroxyalkyl substituted quaternary salts of the heterocyclic bases are also known and described in the literature. In general, they are prepared by reacting the base desired with the appropriate hydroxyalkyl bromide, such as $\beta$-hydroxyethyl bromide, 3-hydroxypropyl bromide, 4-hydroxybutyl bromide, etc.

The alkane sulfones of Formula IV are known in the art. Their synthesis has been described in Lieb. Ann. 562 (1949) pages 23 through 35.

Although the ratio of sulfone to the parent N-hydroxyalkyl substituted dye used in the reaction mixture may be varied over a wide range, we have found that it is preferable to use from 2 to 2.1 moles of sulfone per mole of the parent dye for every sulfoalkoxyalkyl group that is to be substituted per mole of dye.

The reaction time and temperature required for this synthesis may vary considerably depending upon the specific reaction. We have found that it is advantageous to heat the reactants for from about 1 to 4 hours in an oil bath at a temperature in the range of from 120° to 180° C. The preferred temperature range is from 140° to 160° C.

When the reaction is complete, the reaction mixture is cooled, the dye separated and purified by recrystallizations from an appropriate solvent such as methanol, ethanol, acetone, etc., or mixtures of suitable solvents.

Our invention is still further illustrated by examples showing typical representative dyes and their preparations; however, it is to be understood that our invention is not to be limited to these examples.

EXAMPLE 1

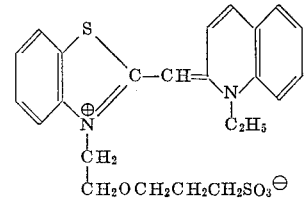

Anhydro-1'-ethyl-3-$\beta$-(3-sulfopropoxy)ethylthia-2'-cyanine hydroxide

A mixture of 2.4 grams (1 mol.) of 1'-ethyl-3-$\beta$-hydroxyethylthia-2-cyanine iodide and 1.2 gram (1 mol.+ 100 percent excess) of 1,3-propane sulfone was heated in an oil bath for 2 hours at a temperature of 150° to 160°. After cooling, the reaction mixture was treated with cold water. The dye which separated was collected on a filter, washed with acetone and dried. After two recrystallizations from methyl alcohol, the dye was obtained as orange crystals, M.P. 262° to 264° dec. Analysis showed the dye to have two molecules of water of crystallization.

EXAMPLE 2

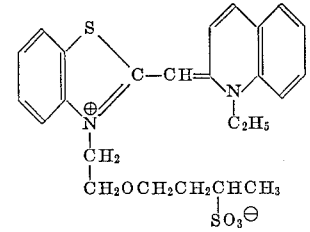

Anhydro-1'-ethyl-3-$\beta$-(3-sulfobutoxy)ethylthia-2'-cyanine hydroxide

A mixture of 2.4 grams (1 mol.) of 1'-ethyl-3-$\beta$-hydroxyethylthia-2-cyanine iodide and 1.4 gram (1 mol.+ 100 percent excess) of 2,4-butane sulfone was heated in an oil bath at 140° to 150° for 2 hours. Crystalline dye separated after the cooled reaction mixture had been treated with cold water. It was purified by two recrystallizations from methyl alcohol and obtained as dull orange crystals, M.P. 278° to 280° dec. Analysis showed the dye to have one molecule of water of crystallization.

EXAMPLE 3

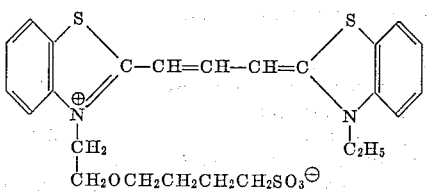

Anhydro-3-ethyl-3'-β-(4-sulfobutoxy)ethylthiacarbocyanine hydroxide

A mixture of 5.1 grams (1 mol.) 3-ethyl-3'-β-hydroxyethyl thiacarbocyanine iodide and 3 grams (1 mol.+110 percent excess) of 1,4-butane sulfone was heated in an oil bath at 140° to 150° for 2 hours. The cooled reaction mixture was stirred up in presence of diethyl ether. The ether was decanted away from a very sticky residue which was then dissolved in a small amount of water from which crystals of dye separated after addition of a large volume of acetone and chilling. The dye was purified by recrystallization from a mixture of one-third methyl alcohol and two-thirds acetone and was obtained as dull brown crystals, M.P. 161° to 163° dec. Analysis showed the dye to have two molecules of water of crystallization.

EXAMPLE 4

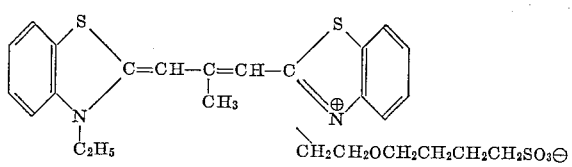

Anhydro-3-ethyl-9-methyl-3'-β-(4-sulfobutoxy)-ethylthiacarbocyanine hydroxide

A mixture of 4.75 grams (1 mol.) of 3-ethyl-3'-β-hydroxyethyl - 9 - methylthiacarbocyanine bromide and 3 grams (1 mol.+110 percent excess) of 1,4-butane sulfone was heated in an oil bath at 140° to 150° for 3 hours. The cooled reaction mixture was stirred up with diethyl ether. The ether was decanted from a very sticky residue which when stirred up with a little cold acetone yielded a solid product. This was collected on a filter, washed with water and acetone and dried. It was purified by recrystallization from a mixture of one-third methyl alcohol and two-thirds acetone and was obtained as bluish crystals, M.P. 160° to 162° dec. Analysis showed the dye to have one molecule of water of crystallization.

Similarly, the N - sulfoalkoxyalkyl substituted merocyanine dyes are prepared by the type synthesis illustrated. For example, the dye 3-methyl-1-phenyl-4-{[3-(3-sulfopropoxyethyl) - 2(3H) - benzothiazolylidene]ethylidene-2-pyrazolin-5-one is prepared by heating a mixture of 3-methyl - 1 - phenyl - 4 - {[3 - (3 - hydroxyethyl) - 2(3H)-benzothiazolylidene]ethylidene - 2 - pyrazolin - 5 -one and 1,3-propane sulfone, and the dye 1,3-diethyl-5-{3-[(4-sulfobutoxyethyl - 2(3H) - benzothiazolylidene) - 2 - butenylidene]}barbituric acid is prepared by heating a mixture of 1,3 - diethyl-5-{3-[(4-hydroxyethyl-2(3H)-benzothiazolylidene)-2-butenylidene]}barbituric acid and 1,4-butane sulfone.

Our solubilized cyanine, carbocyanine and merocyanine dyes are valuable sensitizers for photographic silver halide emulsions. Because of their high degree of water solubility imparted by the sulfoalkoxyalkyl substituent, which distinguishes them from dyes known before, our dyes are readily added to the emulsion in an aqueous solution. Sensitization by means of these dyes is, of course, primarily directed to the ordinarily employed gelatino-silver halide developing-out emulsions. The dyes are ordinarily incorporated in the washed, finished emulsions and should, of course, be uniformly distributed throughout the emulsion. The concentration of the dyes can vary widely, i.e., from about 5 to about 100 mg. per liter of flowable emulsions.

The concentration of the dye will vary according to the types of light-sensitive material in the emulsion and according to the effect desired. The suitable and most economical concentration for any given dye and emulsion will be apparent to those skilled in the art upon making the ordinary tests and observations employed in the art of emulsion making. Sensitization of the emulsion is preferably accomplished by slowly adding the aqueous solution of our dye to the emulsion and stirring until the dye is uniformly distributed throughout the emulison. These statements are only illustrative and are not to be understood as limiting our invention, as it will be apparent that these dyes can be incorporated by other methods in the photographic silver halide emulsions customarily used in the art. For instance, the dyes may be incorporated by bathing a plate or film upon which the emulsion has been coated in an aqueous solution of the dye. Bathing methods, however, are not to be preferred ordinarily.

The solubilized cyanine, carbocyanine and merocyanine dyes of our invention are distinguished from dyes known before by their sulfoalkoxyalkyl substituent on the nitrogen atom of a heterocyclic nucleus in their molecule. Their high degree of water solubility makes our dyes valuable for sensitizing photographic silver halide emulsions because the organic solvents required to dissolve many prior art dyes for sensitizing purposes are not required. The sulfoalkoxyalkyl substituents have also made it possible to use certain dyes as sensitizers that were previously not soluble enough to incorporate in emulsions. The high degree of water solubility shown by our dyes is also valuable because these dyes are readily removed from the photographic elements containing them during normal photographic processing and are not a source of stain such as is a problem with some prior art dyes.

The invention has been described in detail with particular reference to preferred embodiments thereof but it will be understood that variations and modifications can be effected within the spirit and scope of the invention as described hereinabove and as defined in the appended claims.

We claim:

1. A light-sensitive photographic element comprising a support and at least one silver halide emulsion layer containing a sensitizing amount of a dye selected from those having the formula:

(1) 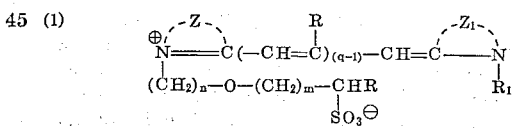

and the formula:

(2) 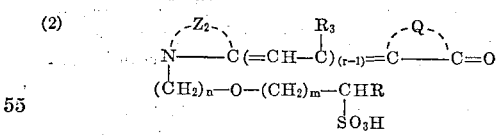

wherein Z, $Z_1$ and $Z_2$ each represents the nonmetallic atoms necessary to complete a heterocyclic nucleus selected from the class consisting of those of the thiazole series, those of the benzothiazole series, those of the naphthothiazole series, those of the oxazole series, those of the benzoxazole series, those of the naphthoxazole series, those of the selenazole series, those of the benzoselenazole series, those of the napthoselenazole series, those of the pyridine series, those of the quinoline series those of the isoquinoline series, those of the imidazole series, those of the benzimidazole series, those of the naphthimidazole series, those of the lepidine series; R represents a member selected from the class consisting of a hydrogen atom and a lower alkyl group having from 1 to 4 carbon atoms; $q$ represents an integer of from 1 to 3; $n$ represents an integer of from 2 to 4; $m$ represents an integer of from 2 to 4; $r$ represents an integer of from 2 to 3; $R_1$ represents a member selected from the class consisting of a lower alkyl group having from 1 to 4 carbon atoms, a carboxyalkyl group having from 1 to 5 carbon atoms, a carbalkoxyalkyl group having from 3 to 5 carbon atoms, a sulfoalkyl group having from 1 to 4 carbon atoms, a hydroxyalkyl group having from 1 to 4 carbon atoms, an alkoxyalkyl group having from 2 to 5 carbon atoms, a sulfoalkoxyalkyl group having the formula $$-(CH_2)_n-O-(CH_2)_m-\underset{\underset{SO_3H}{|}}{C}HR$$

in which $n$, $m$, and R are as defined, and an aryl group; Q represents a heterocyclic nucleus selected from the class consisting of those of the pyrazolone series, those of the 2,4,6-triketohexahydropyrimidine series, those of the 2,4,6-triketo-2-thiohexahydropyrimidine series and those of the indandione series, those of the rhodanine series, those of the hydantoin series, those of the thiohydantoin series, and those of the 2-thio-2,4-oxazolidinedione series; $R_2$ represents a member selected from the class consisting of a hydrogen atom, a lower alkyl group, an alkoxy group, an aryl group, a substituted mercapto group, a thienyl group, an indolyl group, a furyl group, a pyrryl group, and a pyrrocolyl group, such that when $q$ is the integer 3, $R_2$ is a hydrogen atom; $R_3$ represents a member selected from the class consisting of a hydrogen atom, an alkyl group, an aryl group, a thionyl group, an indolyl group, a furyl group, a pyrryl group and a pyrrocolyl group, such that when $r$ is the integer 3, $R_3$ is a hydrogen atom.

2. A light-sensitive photographic element in accordance with claim 1 wherein the sensitizing dye is anhydro-1'-ethyl - 3 - β - (3 - sulfopropoxy)ethylthia - 2' - cyanine hydroxide.

3. A light-sensitive photographic element in accordance with claim 1 wherein the sensitizing dye is anhydro-1'-ethyl - 3 - β - (3 - sulfobutoxy)ethylthia - 2' - cyanine hydroxide.

4. A light-sensitive photographic element in accordance with claim 1 wherein the sensitizing dye is anhydro-3-ethyl-3'-β-(4-sulfobutoxy)ethylthiacarbocyanine hydroxide.

5. A light-sensitive photographic element in accordance with claim 1 wherein the sensitizing dye is anhydro-3-ethyl - 9 - methyl - 3'-β - (4 - sulfobutoxy)ethylthiacarbocyanine hydroxide.

6. A light-sensitive photographic element in accordance with claim 1 containing a sensitizing amount of a dye selected from those having the Formula 1 of claim 1.

7. A light-sensitive photographic element in accordance with claim 1 containing a sensitizing amount of a dye selected from those having the Formula 2 of claim 1.

No references cited.

NORMAN G. TORCHIN, *Primary Examiner.*

A. T. SURO PICO, *Assistant Examiner.*

PO-1050
(5/69)

UNITED STATES PATENT OFFICE
CERTIFICATE OF CORRECTION

Patent No. 3,411,916            Dated November 19, 1968

Inventor(s) Brooker, Leslie, G. S., and Keyes, Grafton, H.

It is certified that error appears in the above-identified patent and that said Letters Patent are hereby corrected as shown below:

Column 1, line 51, change "sulfone" to ---sultone---.

Column 2, formula II, change right hand portion of formula from:

"C=====C=O" to --- C--------C=O ---.

Column 2, line 38, change "$\beta$-methylquinoline" to ---8-methylquinoline---.

Column 2, line 39, change "$\beta$-chloroquinoline" to ---8-chloroquinoline---.

Column 3, line 10, change "(etc" to ---, etc---.

Column 3, line 35, change "2,4,6-trietohexahydropyrimidine" to ---2,4,6-triketohexahydropyrimidine---.

Column 4, line 7, change "2,729,766" to ---2,728,766---.

Column 4, line 14, change "-4-thiazolidene" to --- -4-thiazolidone ---.

Column 4, line 19, change "-2-(1H)-" to --- -2(1H)- ---.

Column 4, line 30, change "sulfone" to ---sultone---.

Column 4, line 33, change "sulfone" to ---sultone---.

Column 4, line 55, change "sulfone" to ---sultone---.

Column 4, line 64, change "indandions" to ---indandione---.

PO-1050
(5/69)

UNITED STATES PATENT OFFICE
CERTIFICATE OF CORRECTION

Patent No. 3,411,916     Dated November 19, 1968

Inventor(s) Brooker, Leslie, G. S., and Keyes, Grafton, H.

It is certified that error appears in the above-identified patent and that said Letters Patent are hereby corrected as shown below:

Column 5, line 15, change "sulfone" to ---sultone---.

Column 5, line 20, change "sulfone" to ---sultone---.

Column 6, line 5, change "sulfones" to ---sultones---.

Column 6, line 8, change "sulfone" to ---sultone---.

Column 6, line 11, change "sulfone" to ---sultone---.

Column 6, line 43, change "sulfone" to ---sultone---.

Column 6, line 69, change "sulfone" to ---sultone---.

Column 7, line 15, change "sulfone" to ---sultone---.

Column 7, Example 4, change the right hand portion of the formula from " 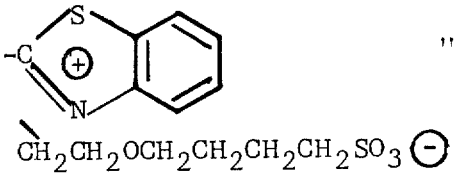 " to --- 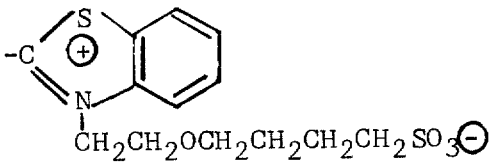 ---

- 2 -

UNITED STATES PATENT OFFICE
CERTIFICATE OF CORRECTION

Patent No. 3,411,916      Dated November 19, 1968

Inventor(s) Brooker, Leslie, G. S., and Keyes, Grafton, H.

It is certified that error appears in the above-identified patent and that said Letters Patent are hereby corrected as shown below:

Column 7, line 39, change "sulfone" to ---sultone---.

Column 7, line 57, change "sulfone" to ---sultone---.

Column 7, line 62, change "sulfone" to ---sultone---.

Column 8, line 10, change "emulison" to ---emulsion---

Column 8, Claim 1, Formula (1), change "(-CH=C)" $\overset{R}{|}$ to --- (-CH=C) ---. $\overset{R_2}{|}$ Column 8, Claim 1, line 65, change "quinoline series" to ---quinoline series,---.

Column 9, line 24, change "thionyl" to ---thienyl---.

Signed and sealed this 3rd day of August 1971.

(SEAL)
Attest:

EDWARD M. FLETCHER, JR.      WILLIAM E. SCHUYLER, JR.
Attesting Officer      Commissioner of Patents